United States Patent [19]

Sutch

[11] 4,230,659
[45] Oct. 28, 1980

[54] METHOD FOR FORMING A RUPTURABLE AREA IN A CONTAINER

[75] Inventor: Brian L. C. Sutch, Thames Ditton, England

[73] Assignee: Airfix Industries Limited, London, England

[21] Appl. No.: 43,903

[22] Filed: May 30, 1979

[30] Foreign Application Priority Data

May 31, 1978 [GB] United Kingdom ............ 24748/78

[51] Int. Cl.³ ........................ B29C 5/00; B29F 1/00
[52] U.S. Cl. ................................ 264/266; 29/527.2;
29/527.4; 113/121 C; 264/130; 264/134;
264/135; 264/138; 264/267; 264/320;
264/328.8
[58] Field of Search .................... 113/15 R, 121 C;
264/138, 328, 266, 259, 267, 229, 320, 130, 134,
135; 220/270, 265; 29/527.2, 527.4; 425/116,
117, 125, 127, 129 R

[56] References Cited

U.S. PATENT DOCUMENTS

| 3,271,499 | 9/1966 | Schwaiger | 425/117 |
|---|---|---|---|
| 3,337,084 | 8/1967 | Song | 220/270 |
| 3,628,688 | 12/1971 | Haggard | 220/270 |
| 3,881,437 | 5/1975 | Lovell et al. | 113/121 C |
| 3,891,116 | 6/1975 | Schane | 220/270 |
| 3,931,909 | 1/1976 | Dall et al. | 113/121 C |
| 3,967,749 | 7/1976 | Walter | 220/265 |
| 4,044,916 | 8/1977 | Beveridge | 220/270 |

FOREIGN PATENT DOCUMENTS 1437159  5/1976  United Kingdom ............ 220/270

Primary Examiner—W. E. Hoag
Attorney, Agent, or Firm—Scrivener, Parker, Scrivener and Clarke

[57] ABSTRACT

A method of making a wall of a container which wall is to be ruptured to gain access to the interior of the container, the method comprising forming a weakening in the wall corresponding to the path along which the wall is to be ruptured, locating the wall between mould tools which are formed as to one of them with a bead recess which will overlie the weakening and as to the other with a rupture recess in register with the bead recess, injecting material into the bead recess to displace the wall regions adjacent the path into the rupture recess to further weaken the connection between the wall parts to either side of the said path, and to form a seal therebetween and removing the wall from the tools.

9 Claims, 5 Drawing Figures ial into said bead channel to form a bead adherent to
METHOD FOR FORMING A RUPTURABLE AREA IN A CONTAINER This invention is concerned with improvements in and relating to containers.

In certain instances it is desirable that a container shall have an openable area in a side or end wall which can be opened by pulling on a tag or ring to thereby rupture the wall along a path which at least partly surrounds the area. A continuous path enables the whole of the area within the path to be removed while an interrupted path allows the area to remain connected to the remainder of the wall at the interruption in the path, the connection then being operable as a hinge to allow the area to be bent back to give access to the container.

To provide a suitable means to rupture a container wall, it has been proposed to provide in a container wall, a slit or slits which lie along the path to be ruptured, and to form a bead on each face of the wall, each bead being formed by injection moulding from its own side of the wall, overlying the slit or slits, extending the length of the path and being connected to the other bead by injected material which has passed into the slit or slits. Pulling on a tag coupled to the exposed bead ruptures the connection between the beads and any part of the wall between the adjacent ends of adjacent slits. However, having removed the exposed bead, there remains the inner bead adherent to the wall to each side of the slit or each slit.

According to the present invention there is provided a method of making a container wall a part of which is to be openable, the method comprising forming in the wall a path where the wall is to be ruptured, the path being a weakening in the material of the wall connecting the openable and an anchored part which is to remain in place after opening, locating the wall between mould tools, the tool on a first face of the wall including a rupture recess with which the path of weakening registers, and the tool on the other face of the wall defining a bead channel which extends along the length of the path and spans the path and a region of the wall on each side of the path and injecting mouldable material into said bead channel to form a bead adherent to the said other face of the wall to displace those wall regions of the openable and anchored wall parts immediately adjacent the path into the rupture recess in the mould tool to further reduce the strength of the connection between openable and anchored wall parts and to form a seal at the displaced wall regions by adhering to the wall adjacent each displaced region and removing the wall from the mould, the resultant wall being openable by pull on the bead to disconnect the openable and anchored parts of the wall.

According to the present invention there is further provided a mould for making a wall of a container, the mould comprising a first tool and a second tool between which a wall member may be clamped, one tool including a bead channel and means for injecting mouldable material into that channel, the bead channel extending along a path on that mould tool corresponding to a rupture path where the wall is to be ruptured, and the other tool including a rupture recess in register with the bead channel into which regions of the wall adjacent the rupture path of the wall will be displaced by the injected material to reduce the strength of connection between the wall parts to each side of the rupture path.

By injection moulding only on one face of the wall, preferably the ultimate outer face, and providing the rupture recess behind the path, the path can be a series of short slits or perforations or a score whereby the wall remains relatively strong for handling prior to insertion between the mould tools, but is sufficiently weakened along the path to result in a disconnection of the wall parts along the path when the bead is pulled away.

The container wall may be a sheet of suitable material which will form a seal or pilfer proof membrane across an open face of a container. In that case the sheet when located between the mould tools may have moulded thereon a rim for attachment, as by induction heating, sonic welding or adhesion, to the container. The rim will conveniently be integral with the bead and in order to allow the bead to be pulled away to open the membrane, a line of weakening, such as a region of reduced thickness, will be provided in the moulding between the rim and the bead. The injection will then be effected preferably into the mould cavity which will define the rim, the rim will have a section to give a circumferential flow of injected material before forming the rim proper and the bead will be formed by flow of material through the region of the mould cavity defining the region of reduced thickness. The connection between the wall parts is such as to be able to withstand the pressure in the bead channel while that channel fills with material and the wall regions will then be displaced into the rupture recess. Should the connection break prematurely injected material will flow along the rupture recess and the desired weakening of the connection will not occur.

In order that the invention may be well understood there will now be described some embodiments thereof, given by way of examples only reference being had to the accompanying drawing in which.

Figure 1:
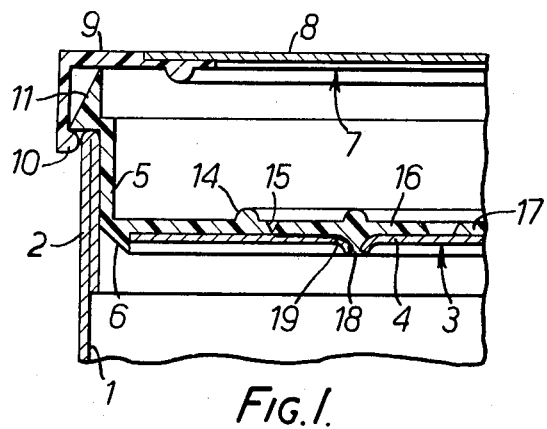
FIG. 1 is a section through a part of a container on the line I—I of FIG. 2 but with a cap applied.
Figure 2:
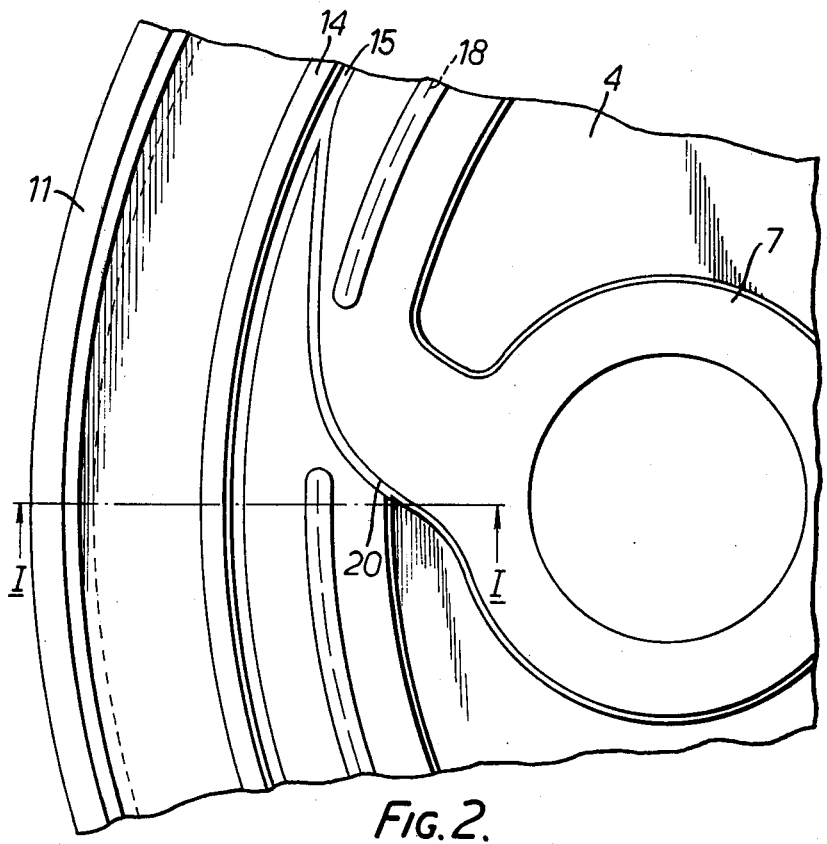
FIG. 2 is a plan view of the container of FIG. 1 without a cap applied.

The container may be of a variety of different types but here is shown as having a cylindrical wall 1 of board of which the lip 2 is formed by rolling over the free edge of the board.

The container is closed by a closure 3 which comprises a closure wall 4 of card or board having a peripheral injection moulded rim 5, a part 6 of which will lead rim 5 into container lip 2. The closure 3 has an openable area to be described and, after opening, the container may be reclosed by cap 7 which again is a composite element having a panel 8 of card or board and an injection moulded rim 9 which has a bead 10 defining a recess for snap engagement with a rib 11 of the rim 5.

The closure wall 4 initially has a path where the wall is to be ruptured to produce an opening, and this path is defined by weakening such as perforations, scoring or the like, the path defining the openable area either as a continuous path or an interrupted path. In the present embodiment a continuous path defines a circular openable area surrounded by an annular region which will remain anchored in the container. The wall is then positioned between mould tools A, B and C of an injection moulding machine the latter of which also serves as a stripper. The tool A which abuts the face of the wall which will not be exposed, that is which will be inward of the container, has a shallow recess D of sufficient depth to provide no support for the wall immediately adjacent the path of weakening. The tool B abutting the face which will be exposed, defines a mould recess E which includes a feed channel part 14' which in the moulding corresponds to part 14, a restriction 15' which in the moulding corresponds to a bead weakening 15, where the bead thickness is reduced and a part 16' corresponding in the moulding to a tear band part 16 and a pull tag 17. The surfaces of the mould which define the internal surfaces of the rim 5 are suitably dimensioned to release the moulding when the stripper C is moved downwards as illustrated.

When material is injected it enters the feed channel 14' through gate G. Because of the greater cross section of channel 14' relative to the adjacent parts of the recess in tool B the injected material flows circumferentially round the wall 4 within channel 14' first. Thereafter material flows radially outwardly over the edge of wall 4, since the rim defining region of the recess is deeper than restricted part 15', while pressing the wall against the mould tool A thereby preventing flow of material between the wall and that tool.

Radially outward flow is followed by radially inward flow from the feed channel which flows past the restriction corresponding to bead weakening 15 and flows round the recess which will define the tear band and pull tag. During this circumferential flow the connection across the path joining the inner and outer parts of the wall 4 holds but as pressure in the tear band mould recess builds up on filling of that recess, the connection will either stretch or break thus reducing the initial strength of that connection and making rupture of the card or board along that path easier and easier still where that connection is broken down altogether by the injected material. The injected material which enters the space between the displaced wall regions immediately adjacent the path forms a seal 18.

The tool A will preferably be in two parts a core A' and a ring A" which are relatively movable. In the open condition core A' is below (as shown) ring A" which is itself below tool B. A blank of card is dropped between core A' and ring A" which then both move to the closed condition, the blank being carried by the core so that it is clamped between core A' and tool B.

The face of the wall 4 which will be exposed may be provided with a surface 19 to which the injected material will not bond, that surface being immediately outward of the path of weakening relative to the openable area and within the bead weakening 15. Thus the bead adheres to the openable area and to that wall part outside the openable area which is itself outside the non-adherent surface. The wall 4 is also non-adherent where the tag is moulded.

After the closure 3 is applied to the container, a pull on the tag will rupture the band at 20 and thereafter break the bead at 15. The bead inward of the bead weakening 15 will come cleanly off the wall 4 outside the path of wall weakening and will tear away from the wall within the openable area. As the tear progresses the openable area will tend to lift as the band tears away from it and on completion of a break of the bead weakening the openable area will withdraw with the bank and a clean lip of board will remain around the open area.

The cap may be used to reclose the container after removal of the openable area.

By providing bead weakening spaced from the limit of the non-adherent surface remote from the seal, a degree of barrier can be maintained in the extent of moulding between the base of the weakening and the non-adherent region which would be absent if the weakening were positioned over the non-adherent surface.

Figure 3:
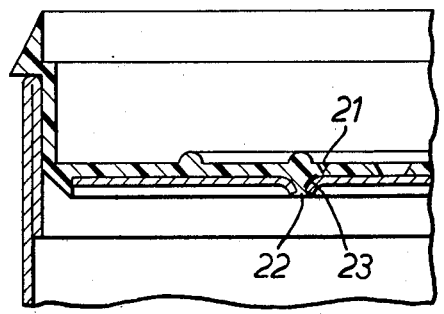
FIG. 3 is a section of a further embodiment according to the invention.
Figure 4:
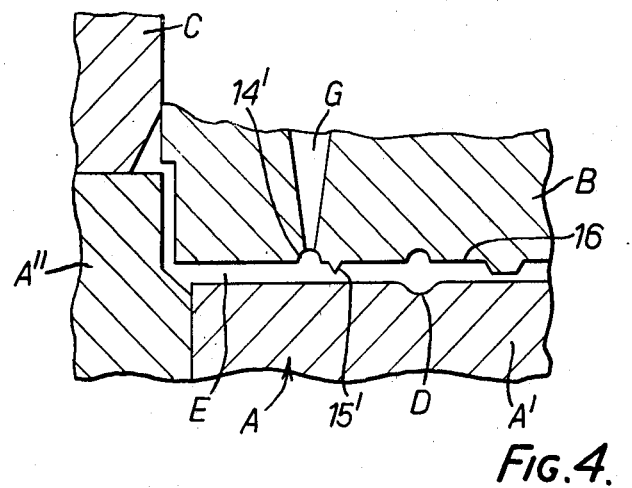
FIG. 4 is a diagrammatic scrap section of a mould.

Referring to FIG. 3 there is shown a further embodiment in which a bead weakening 21 is within a seal 22 and the surface 23 of the wall inward of the seal is non-adherent relative to the moulding. Upon rupture at the bead weakening 21 the moulding inward of the bead weakening will come away from the anchored part of the moulding as the bead material is pulled away and in this case there will remain after opening a clean moulded lip.

To form a barrier between the rim and container suitable known means may be used according to the materials employed, e.g. sonic or direct or induction heat welding.

It will be understood that whilst we have described a method of constructing a wall with a peripheral moulded rim with which the tear band is integral, it is not essential for rim to be present or for the bead to be integral with it where it is present. Where there is no rim or the tear band is a separate unit, the tear band will be formed as before by injecting into a mould recess over the path which in turn is in register with a rupture recess.

Figure 5:
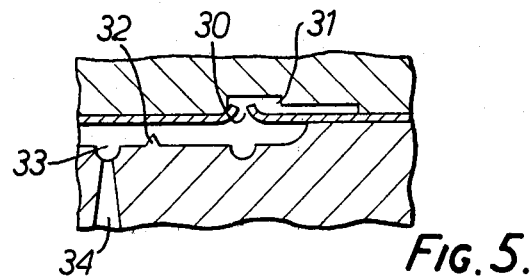
FIG. 5 is a scrap section of a second embodiment of mould with the bead moulded on the face which will be innermost.

It is also not essential for the bead to be on that face which will be exposed. In that event the tool incorporating the rupture recess will include a connection to a pull tag defining recess. This is shown diagrammatically in FIG. 5 where the mould rupture recess is shown at 30, pull tag recess at 31 communicating with recess 30, bead weakening restriction at 32, a feed channel at 33 and an injection gate at 34.

Blank feeding apparatus suitable for round blanks and mould tools and blank feeds suitable for rectangular blanks are shown respectively in published U.S. Pat. No. 4,025,255 and U.S. Pat. No. 4,149,838.

I claim:

1. A method of making a container wall a part of which is to be openable, the method comprising forming in the wall a path where the wall is to be ruptured, the path being a weakening in the material of the wall connecting the openable and an anchored part which is to remain in place after opening, locating the wall between mould tools, the tool on a first face of the wall including a rupture recess with which the path of weakening registers, and the tool on the other face of the wall defining a bead channel which extends along the length of the path and spans the path and a region of the wall on each side of the path and injecting mouldable material into said bead channel to form a bead adherent to said other face of the wall, to displace those wall regions of the openable and anchored wall parts immediately adjacent the path into the rupture recess in the mould tool to further reduce the strength of the connection between openable and anchored wall parts and to form a seal at the displaced wall regions by adhering to the wall adjacent each displaced region and removing the wall from the mould, the resultant wall being openable by pull on the bead to disconnect the openable and anchored parts of the wall.

2. The method according to claim 1 in which the bead is moulded from that face of the wall which will be exposed.

3. The method according to claim 1 in which the path weakening in the wall is formed by scoring.

4. The method according to claim 1 in which the path weakening is formed by spaced slits.

5. The method according to claim 1 in which the wall has a polytetrafluorethylene surface where the moulding is to bond thereto.

6. The method according to claim 1 in which the bead channel communicates with an adjacent channel, a restriction being formed in the mould between the bead channel and the adjacent channel whereby there is formed a weakening between the parts moulded in the respective channels and when the bead in the finished product is pulled away it will break from the moulding moulded in the adjacent channel at the weakening.

7. The method according to claim 6 in which the restriction region is outward relative to the path weakening, and lies between the bead channel and a rim defining channel.

8. The method according to claim 6 in which the reduced region is inward relative to the path and lies between the bead channel and an inner ring defining channel.

9. The method according to claim 6 in which a region of the wall extending from the path weakening toward but spaced from the region which the bead weakening will overlie is provided with a release coating.

* * * * *